US006215734B1

(12) United States Patent
Moeny et al.

(10) Patent No.: US 6,215,734 B1

(45) Date of Patent: Apr. 10, 2001

(54) ELECTROHYDRAULIC PRESSURE WAVE PROJECTORS

(75) Inventors: William M. Moeny; Niels K. Winsor, both of Albuquerque, NM (US)

(73) Assignee: Tetra Corporation, Albuquerque, NM (US)

( * ) Notice: Subject to any disclaimer, the term of this patent is extended or adjusted under 35 U.S.C. 154(b) by 0 days.

(21) Appl. No.: 09/230,992

(22) PCT Filed: Aug. 5, 1997

(86) PCT No.: PCT/US97/13924

§ 371 Date: May 3, 1999

§ 102(e) Date: May 3, 1999

(87) PCT Pub. No.: WO98/06234

PCT Pub. Date: Feb. 12, 1998

Related U.S. Application Data

(60) Provisional application No. 60/023,197, filed on Aug. 5, 1996, and provisional application No. 60/023,170, filed on Aug. 5, 1996.

(51) Int. Cl.[7] .......... G01V 1/40

(52) U.S. Cl. .......... 367/147; 181/106

(58) Field of Search .......... 367/147; 181/105, 181/106; 166/249

(56) References Cited

U.S. PATENT DOCUMENTS 4,741,405 * 5/1988 Moeny et al. .......... 175/16
5,228,011 * 7/1993 Owen .......... 367/147
5,398,217 * 3/1995 Cannelli et al. .......... 367/147
5,432,756 * 7/1995 Bryden .......... 367/139

* cited by examiner

*Primary Examiner*—J. Woodrow Eldred
(74) *Attorney, Agent, or Firm*—Peacock, Myers & Adams PC

(57) ABSTRACT

A projector (10) for creating electrohydraulic acoustic and pressure waves comprising an energy source (21) (such as a capacitor) within approximately one meter of an electrode array (23). Larger projectors may be formed by arraying the projectors, and still larger projectors by arraying them.

52 Claims, 20 Drawing Sheets

ELECTROHYDRAULIC PRESSURE WAVE PROJECTORS

CROSS-REFERENCE TO RELATED APPLICATIONS

This application claims the benefit of the filing of U.S. Provisional Application Serial No. 60/023,197, entitled High Power, High Energy Underwater Plasma Electroacoustic Pressure Wave Projector, filed on Aug. 5, 1996, and U.S. Provisional Patent Application Serial No. 60/023,170, entitled Compact, High Efficiency Electrohydraulic Drill and Mining Machine, filed on Aug. 5, 1996, and the specifications thereof are incorporated by reference.

This application is also related to U.S. Provisional Application Serial No. 60/011,947, entitled High Power Underwater Plasma Control Methodology for Acoustic and Pressure Pulse Sources, filed on Feb. 20, 1996, and the specification thereof is incorporated by reference.

BACKGROUND OF THE INVENTION

1. Field of the Invention

Technical Field

The present invention relates to electrohydraulic projectors, particularly those utilizing an electrical plasma in a liquid to create acoustic, pressure, and shock waves, and methods for efficiently coupling the electrical current to the plasma.

2. Background Art

The underwater plasma (10) physical processes at issue are shown in FIG. 1. When high voltage is impressed across two electrodes (11) immersed in water (12) or some other liquid, and the electric field (voltage divided by the electrode separation and modified for the shape of electrodes) is above the breakdown electric field of the water (12), then a conducting plasma channel (10) forms between the two electrodes (11). Especially if significant current is passed through the conducting channel (10), a number of important events occur. A zone of steam or vapor is formed around the plasma channel (10), and this bubble (13) of steam (14) propagates outward from the channel (10) at a rate that is a function of the power deposited by the electrical current in the channel (10). Power is conducted from the channel (10) to the steam (14) via thermal conduction and by thermal radiation. A significant portion of the thermal radiation is trapped in the water (12) and produces ablation of the bubble wall (13), thus adding additional steam (14) to the bubble (13).

An underwater plasma of this type can be controlled to have useful characteristics. High power levels in the underwater plasma (10) will produce very strong pressure waves (15) as the steam bubble (13) expands against the water. Lower power levels in the plasma will produce acoustic waves (15) to produce sound for particular applications. By modifying the temporal behavior of the power deposition in the plasma (10), and taking into account the inertia of the moving water, the acoustic spectrum can be modified.

There are a number of situations where it is desirable to create intense shock waves or high pressure waves under water. These applications include: 1) crushing rock for mining and drilling, 2) obstacle clearing where such high pressure waves are created to remove or destroy obstacles such as reefs, old concrete construction, or similar objects, and 3) where it is desired to create high energy acoustic waves for undersea oceanographic mapping. Using electrical sparks underwater or underwater plasmas for the creation of pressure waves has been attempted. However, it has not heretofore been possible to create efficient high energy waves. The primary reasons for this are the difficulty with efficiently loading energy into salt water and the difficulty of efficiently loading electrical energy into any type of underwater plasma.

Most drilling techniques utilize mechanical fracturing and crushing as the primary mechanism for pulverizing rock. A new approach utilizing underwater sparks called spark drilling, was introduced in the 1960's and mid 1970's. Maurer (Maurer, W. C., "Spark Drilling," Proc. 11th Symposium on Rock Mechanics, University of California, Berkeley, Jun. 16–19, 1969) described earlier work on spark drilling, including some high pressure chamber testing of the spark apparatus. Sandia National Laboratories picked up the concept and began to pursue it aggressively. Alvis, R. L., "Improved Drilling—A Part of the Energy Solution," Sandia Laboratories Report No. SAND-75-0128, Albuquerque, N. Mex., March 1975; Newsom, M. M., "Program Plan for Improving Deep Drilling," Sandia National Laboratories Report No. SLA-74-0125, Albuquerque, N. Mex., May 1974; and Newsom, M. M., "Drilling Research at Sandia National Laboratories," Sandia Laboratories Report No. SAND-76-5194, Albuquerque, N. Mex., March 1976. Sandia primarily focused on preventing flashover of insulators and were able to measure reasonable drilling rates. A major thrust of the Sandia work was controlling electric fields in an attempt to overcome the spark-over problem. Wardlaw (Wardlaw, R., et al., "Drilling Research on the Electrical Detonation and Subsequent Cavitation in a Liquid Technique—Spark Drilling," Sandia National Laboratories Report No. SAND-77-1631, Albuquerque, N. Mex., 1978) conducted tests of the 20 cm drill with a nominal power output of around 25 kW and demonstrated high peak pressures in the 500–1000 mega Pascal range during the testing. However, electrode life and the capability of efficiently loading energy into the water caused Sandia to discontinue work on the drills.

Other research was conducted with other variations of spark drills including utilizing sparks to enhance cutting power of low pressure water jets. These early experiments are well summarized in Maurer's book. Maurer, William C., *Advanced Drilling Techniques*, Petroleum Publishing Co., Tulsa, Okla., 1980.

The common problem in all of these spark approaches is that they dealt with the mechanics of the shock wave or insulator flashover problem but did not address the primary issue, which is control of the underwater plasma that creates the shock wave. For the last decade, Tetra Corporation has focused on understanding and controlling this plasma for spark drill technology development. U.S. Pat. No. 4,741,405, to Moeny et al., taught a technique for controlling power to the arcs through the use of pulse forming lines. This produced a substantial enhancement of the drilling process.

SUMMARY OF THE INVENTION (DISCLOSURE OF THE INVENTION)

The present invention is of a projector for creating electrohydraulic acoustic and pressure waves comprising an energy source within approximately one meter (preferably within approximately 50 cm, and most preferably within approximately 10 cm) of an electrode array. In the preferred embodiment, a switch (triggered or self-break) is used to connect the energy source to the electrode array. The switch may be a round aperture pseudospark switch, a low pressure gas switch, a liquid, vacuum, or gas spark gap, a mechanical metal switch utilizing mechanical means to make contact between two connectors, a metal vapor filled switch, an SCR, a GTO, or other solid state device. The electrode array may be one or more electrodes. The energy source is preferably a capacitor or an inductive storage device. If a capacitor, it preferably has a slow wave structure and controlled inductance. Suitable capacitors include those employing concentric cylinders, embedding in a liquid dielectric, embedding in a high dielectric strength and high dielectric constant insulating polymer, oil and kraft paper with metal films fabricated as individual cylinders, metalized ceramic cylinders, and metal film on ceramic cylinders. The energy source may be a stem capacitor which is pulse charged via a pulser and cable, whereby the pulser utilizes a switch selected from the group consisting of triggered and self-break switches. The projector may include operation of an array of underwater plasmas in series wherein an impedance of each electrode adds to a next electrode gap impedance and a net load impedance is a sum of individual gaps utilizing capacitance from each electrode to ground to assist in gap breakdown, which operation may employ a strip line comprising a plurality of gaps operated in series, each with a closely coupled current return conductor to minimize inductance and provide capacitance for breaking down each gap, preferably with electrodes replacing flat segments of the strip line. One or more reflectors may be used to improve pressure wave efficiency, a plurality of electrode pairs arrayed symmetrically and separated by insulators (with the electrode pairs preferably staggered in the axial direction of the projector), a plurality of strip lines of series gaps arrayed such that current flows through the strip lines in parallel, the projector ordered to conduct electrical current in parallel, and a guidance structure built around the array of underwater plasmas to improve focusing and pressure wave control.

The invention is also of a projector for creating electrohydraulic acoustic and pressure waves comprising a plurality of the projectors of the preceding paragraph set in an array. In one embodiment, each of the electrode arrays comprises a discrete energy source and switch. In another embodiment, each of the electrode arrays comprises a discrete energy source but the energy sources are fired in groups of two or more with a single switch controlling each group. An outer case for the array of projectors is preferably employed wherein current return occurs through the outer case rather than individual stems of each projector in the array. The arrays of electrodes may be connected together to form a semi-continuous set of electrode arrays with multiple arc sites. The energy sources may be linked together to form a semi-continuous energy source array driving an array of electrode arrays.

The invention is further of a projector for creating electrohydraulic acoustic and pressure waves comprising a plurality of projectors of the preceding paragraph arrayed in an array to provide a means for mining large areas.

A primary object of the present invention is to provide a device and method to achieve high power transfer from stored electrical energy to an underwater plasma.

A primary advantage of the present invention is that it provide for multiple channels for distributed control of shock waves.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 3 shows the nested cylindrical capacitors embodiment of the invention. It shows the nested cylindrical storage capacitors (31), the switch (22), the electrode array (23), and the pulse charge connection (24).

FIG. 5 shows two options in the electrical layout of the capacitor and switch section.

FIG. 6 is a coaxial pulse forming line embodiment of the circuits shown in FIG. 5.

FIG. 7 FIG. 7 embodies multiple switches (71), acting to invert multiple primary capacitors (72) which add to multiple secondary capacitors (73) to produce an output voltage at the output section (74), which is n times the charge voltage of any given section. This embodiment requires multiple switches to accomplish.

FIG. 15 shows outer electrodes (131), the inner electrodes (132), the insulator (134), the gaps (133), the series connection between two inner electrodes (135), and the electrode feed and support structure (136).

FIG. 18 shows the capacitor (21), the switch (22), the electrode array (23), the pulse charge cable connection to the pulse generator (24) (not shown), the drill stem shell that contains the capacitor (171), and the cable (168) that connects the pulse generator to the drill tip. This only one of many embodiments of the electrohydraulic projector and the station for drilling in rock. Other embodiments are possible, being simply other arrangements of the components described herein.

DESCRIPTION OF THE PREFERRED EMBODIMENTS

(BEST MODES FOR CARRYING OUT THE INVENTION)

Figure 1:
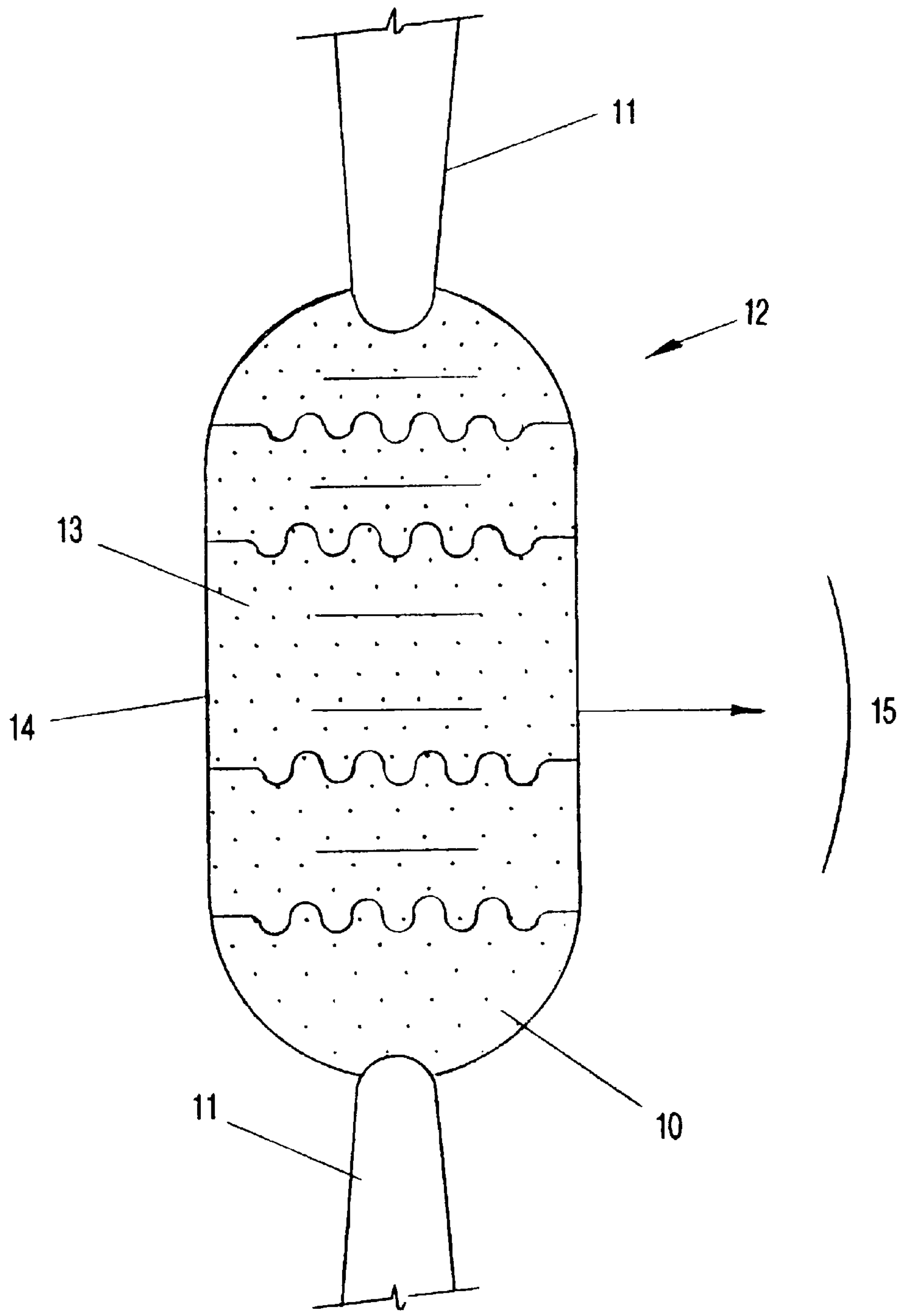
FIG. 1 shows the physical processes occurring in an under water plasma.

The present invention is an apparatus for and method of controlling the source impedance for an underwater plasma in order to efficiently transfer electrical energy to the plasma. This invention overcomes the weaknesses in power transfer efficiency of prior art underwater spark pressure wave projector systems. The invention comprises packaging the pulsed power components, especially the capacitor, in close proximity (preferably within approximately one meter, more preferably within approximately 50 cm, and most preferably within approximately 10 cm) to the electrode gap or gaps in order to minimize stray inductance and to maximize power transfer to the underwater plasma. A low inductance switch capable of passing high current connects the energy storage device to the electrodes. In one embodiment, the switch is incorporated into the electrode gap and a low inductance connector connects the energy storage device to the electrode/switch array.

One approach for enhancing breakdown voltage at the electrodes is to make the transition section into a pulse forming line transformer to change the impedance of the pulse forming line and increase the breakdown voltage. This approach requires fast current rise time from the switch. If the PFL transformer is then made sufficiently short, the high voltage pulse will be impressed upon the electrodes for a short period of time. However, once the electrode gaps have broken down, the stray inductance from the PFL transformer will be small, and its inductive effect upon the primary power flow from the capacitor to the electrodes will be small.

Another embodiment is to arrange the drill stem capacitor so as to provide a doubling of the voltage by using two capacitor sections as a Blumlein that are added by the closing of the switch. This approach also reduces the amount of the current flowing through the drill stem switch. This approach combined with the tuned transition section between the switch and the electrodes described above can provide a further multiplication of the feed voltage to the bit.

Multiple electrode gaps can be run in parallel to provide very high current through the gaps and a plane parallel pressure wave.

An important aspect of the invention is the method of operating an array of underwater plasmas in series so that each electrode gap impedance adds to the next electrode gap impedance, and the net load impedance is the sum of the impedance of the individual gaps.

Several strip line series gaps can be connected in parallel to form an array of electrode gaps to produce a near-plane pressure wave. This embodiment would be used in a situation where the plasma impedance of a single gap is adequate to achieve reasonable energy transfer, but where the gain in focusing and pressure wave delivery to the target from using sixteen gaps instead of one is significant. This array would provide sixteen individual pressure waves, if each gap is separated from the other by a few wave lengths, at a load impedance equivalent to a single gap. It can readily be appreciated that such a series parallel array can be designed to produce a load impedance higher than that of a single gap, or lower than that of a single gap, by varying the ratio of the number of gaps in a given strip line to the number of parallel strip lines.

The electrohydraulic pressure wave generator in a pulse generator can be installed in a drill for drilling holes in rock for explosives or for the installation of roof bolts. The drill stem capacitor is pulse charged from the pulse generator.

Figure 20:
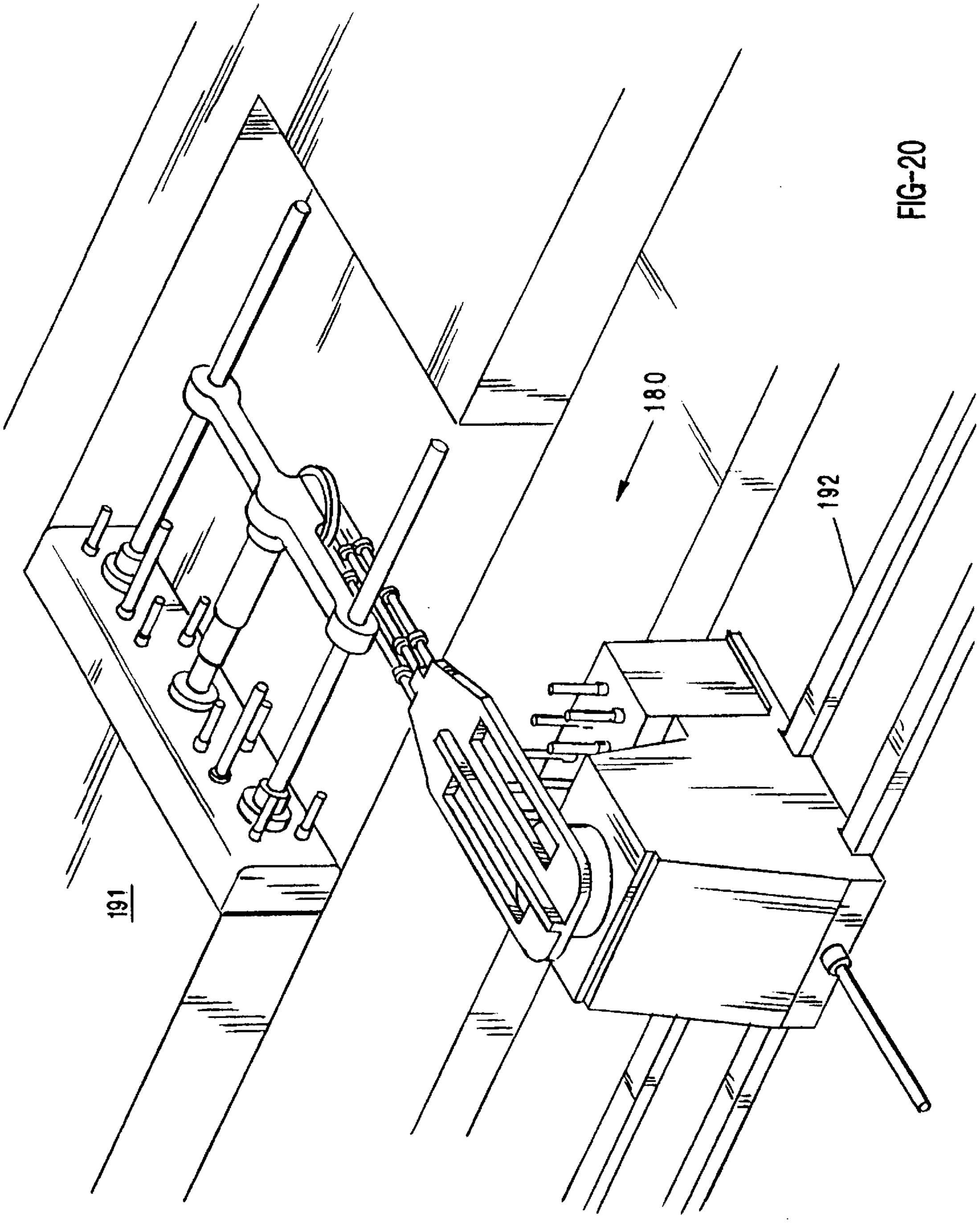
FIG. 20 shows a mining machine (180) mounted on rails (192), mining a vein of ore (191) in an under ground mine.

It is possible to arrange a series of the projectors of the invention in a two-dimensional array to provide the capability of mining the rock in a rectangular slot for either mine construction or for mining a vein of ore. Such an array can be expanded to two dimensions to provide a larger array of projectors, for boring tunnels and mining large blocks of ore. The projectors can be arrayed along the wall of an ore crushing machine to crush ore, as shown in FIG. 20. Ore to be crushed is brought along the wall, and by repeated firing of the projectors, shock waves are generated which crush the ore. Water flow can be utilized to control the particle size in the crushing process by flowing upward vertically in the ore crusher, bringing the ore past the array of projectors. The water flow is adjusted so that very small particles of the size desired flow out through the top, while larger particles that still need to be crushed sink down through the water. In this fashion, the system acts to separate the ore, keeping the particles in the water stream for the desired length of time until they've been crushed to the correct fineness.

The optimum way to transfer stored electrical energy into a plasma is by matching the source impedance to the plasma impedance. Previous techniques sought to match the source impedance to the plasma impedance during the resistive phase of the plasma, and hence load energy into the plasma only during the resistive phase. This technique was only partially successful, in part because of inadequate understanding of the temporal behavior of the plasma impedance. The present invention packages all of the components in such a way that the impedance of the source that provides the current for the plasma more closely matches the plasma impedance. One element of this invention is to achieve this match by minimizing stray inductance so that the circuit inductance is controlled to produce the desired source impedance. The development of high energy density polymers for fabricating low inductance capacitors has also led to new capabilities that are manifest in the subject invention.

Figure 2:
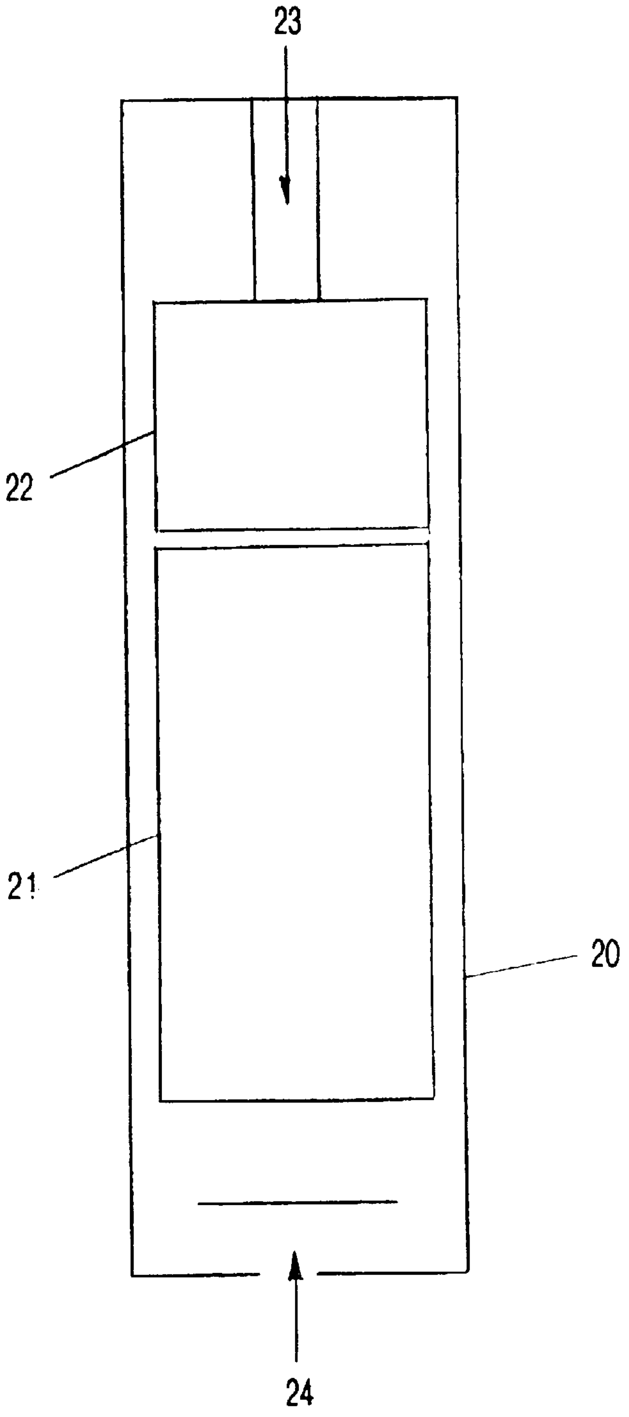
FIG. 2 shows the basic high energy Electrohydraulic Projector (20). The low inductance energy storage device (21), such as a capacitor, is shown connected by a switch or low inductance connector (22) to the electrode array (23). The energy storage device (21) is pulse charged via electrical connection (24) from the pulse generator (25), not shown.
Figure 3A:
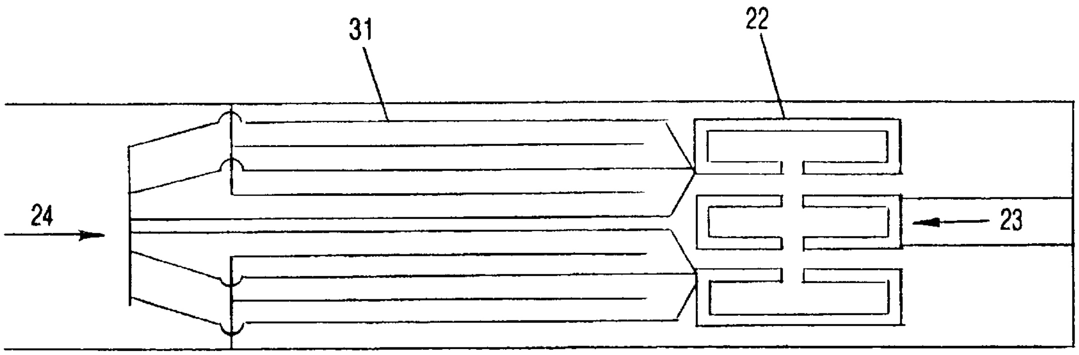
FIG. 3A shows a side view and FIG. 3B shows an end view of the nested cylindrical capacitors.
Figure 3B:
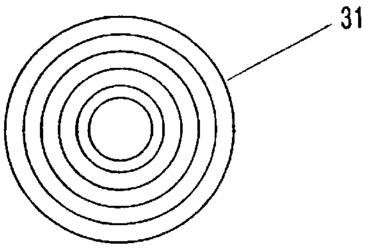

FIG. 2 shows the basic low inductance electrohydraulic projector (10) of the invention. The pulsed power components are packaged in close proximity to the electrode gap or gaps in order to minimize the stray inductance, and to maximize power transfer to the underwater plasma. A capacitor or other energy storage device (21) is used to store electrical energy in the drill stem in close proximity to the electrodes (23). A low inductance switch (22) capable of passing high current connects the energy storage device (21) to the electrodes (23). In one embodiment, the switch (22) is incorporated into the electrode gap (23) and a low inductance connector (22) connects the energy storage device (21) to the electrode/switch array (23). Typically, the energy storage device (21) will be pulse-charged from another source (25) to minimize the dwell time of the energy and the energy storage device (21) and hence, the volume of the energy storage device.

There are several alternative embodiments of the command charge switch in the drill stem. The drill stem switch might be a linear or radial pseudospark switch. Young, C. M., and Cravey, W. R., U.S. patent application Ser. No. 08/890,485, entitled "Non-Round Aperture Pseudospark Switch," filed Jul. 9, 1997. Such a switch could be triggered over a fiber optic link from the control system or could be triggered electrically from an electrical pulse transmitted by the control system. This switch is most desirable for this application because it combines high current carrying capability with fiber optic triggering and low inductance.

Other switches that are applicable to this application include vacuum spark gaps, which are electrically or optically triggered, high pressure spark gaps which are either electrically or optically triggered, thyratrons, which are electrically or optically triggered, and mechanical switches which will be electrically or pneumatically controlled. The electrode gaps can also be used as a self-break switch, thus minimizing the transfer inductance from the capacitor to the electrodes. The primary selection criteria for choosing a switch are: 1) ease of triggering and control, 2) low inductance, 3) reliable high voltage stand-off, 4) reliable high current carrying capability, and 5) longevity.

Figure 4:
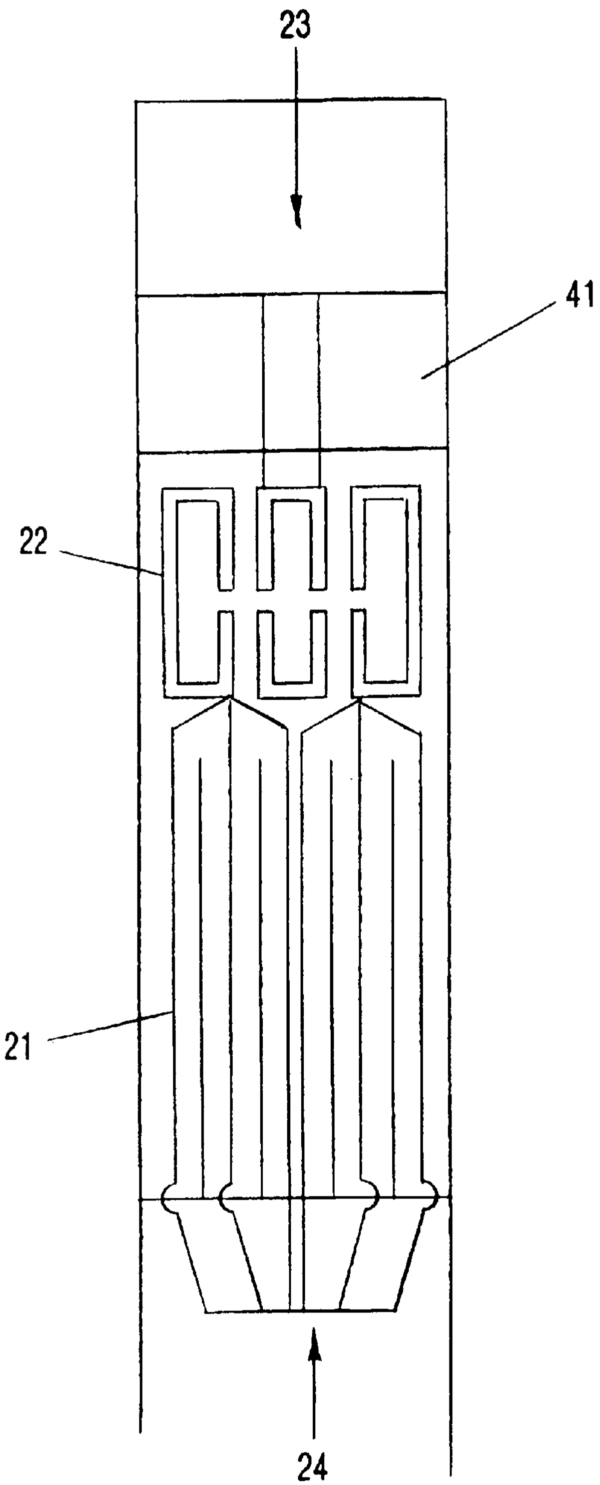
FIG. 4 shows the embodiment of the invention utilizing a transition section or pulse forming line transformer section (41) located between the switch (22) and the electrode array (23) to enhance the breakdown voltage imposed on the array.

There are several embodiments of the drill stem capacitor. This is an important component of the invention because the close coupling of this capacitor to the drill bit electrodes is so crucial. A first embodiment is to utilize a metal film with oil and paper, or a metalized polymer capacitor wound symmetrically about the core. The power is extracted from the edge of the windings to result in low inductance. An alternate embodiment is to utilize concentric cylinders, as shown in FIG. 4, embedded in a liquid dielectric. These are arrayed concentric to each other, every other layer is connected together, so that one group of layers becomes the high voltage side of the capacitor, and the other group of layers becomes the low voltage side of the capacitor. This arrangement is very similar to a large number of pulse forming lines arrayed in parallel. This configuration yields a very low inductance configuration for a high power flow to the electrodes. For many drilling applications, the concentric cylinders approach, utilizing insulating oil, will provide adequate energy storage. This approach is especially attractive because it provides very good power flow to the drill bit with minimum inductance. An alternate approach is to utilize high dielectric strength, high dielectric constant insulating polymer or kraft paper with oil with metal films fabricated as individual cylinders. Another alternate approach is to utilize metalized ceramic cylinders or metal film with ceramic cylinders as the capacitors.

In some situations it is desirable to increase the voltage that is delivered to the drill bit electrodes. Especially with low salt content, the breakdown voltage of the water can be fairly high. One approach is to provide a drill bit with sufficient capacitance and an impedance similar to that of the source capacitor so as to provide an increase in voltage from the reflection of the voltage wave generated by the open drill electrode gaps. For this approach to be effective, the drill stem switch must have a rate of rise of current across it that is short compared to the transit time of the wave to the drill bit. The transition section as shown in FIG. 4 between the drill stem switch and the bit must provide adequate transit time for wave reflection to enhance breakdown at the bit. An alternate approach for enhancing breakdown voltage at the electrodes is to make the transition section into a pulse forming line transformer to change the impedance of the pulse forming line, and increase the breakdown voltage. As above, this approach requires fast current rise time from the switch. The input impedance for the PFL transformer is comparable to that of the switch and storage capacitor impedance. However, the PFL transformer changes impedance so that at the end of the PFL transformer the impedance is significantly higher than at the beginning (FIG. 4). This change in impedance provides an increase in voltage at the output of the transition section, compared to the voltage at the input. If the PFL transformer is then made sufficiently short, the high voltage pulse will be impressed upon the electrodes for a short period of time. However, once the electrode gaps have broken down, the stray inductance from the PFL transformer will be small, and its inductive effect upon the primary power flow from the capacitor to the electrodes will be small.

Figure 5A:
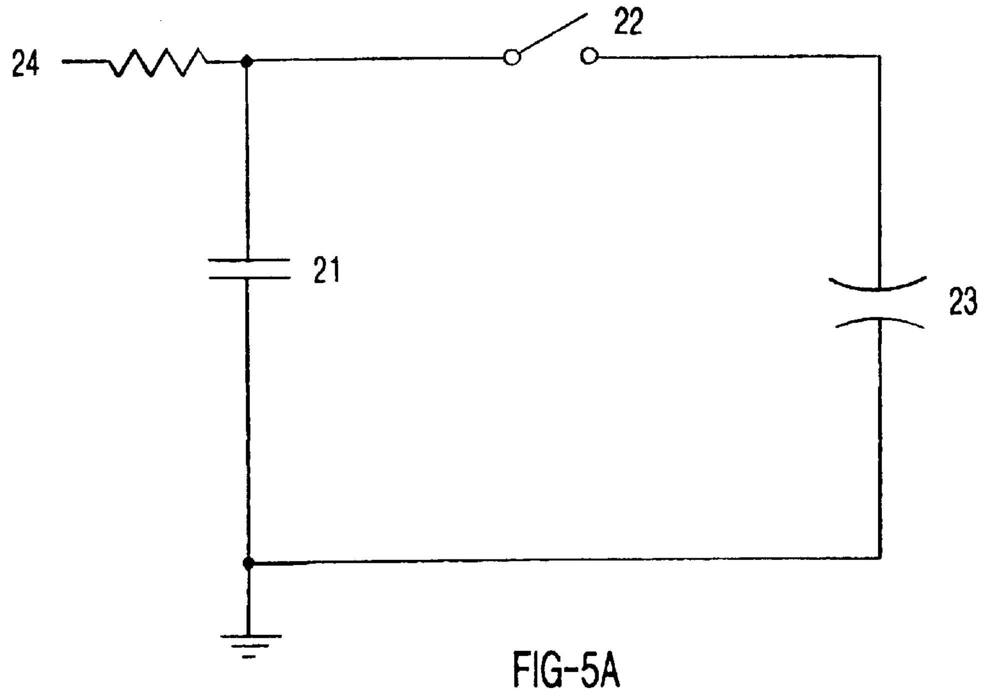
FIG. 5A shows the capacitor (21) connected by the switch (22) to the electrode gaps (23). The pulse charging connection (24) feeds energy to the capacitor (21).
Figure 5B:
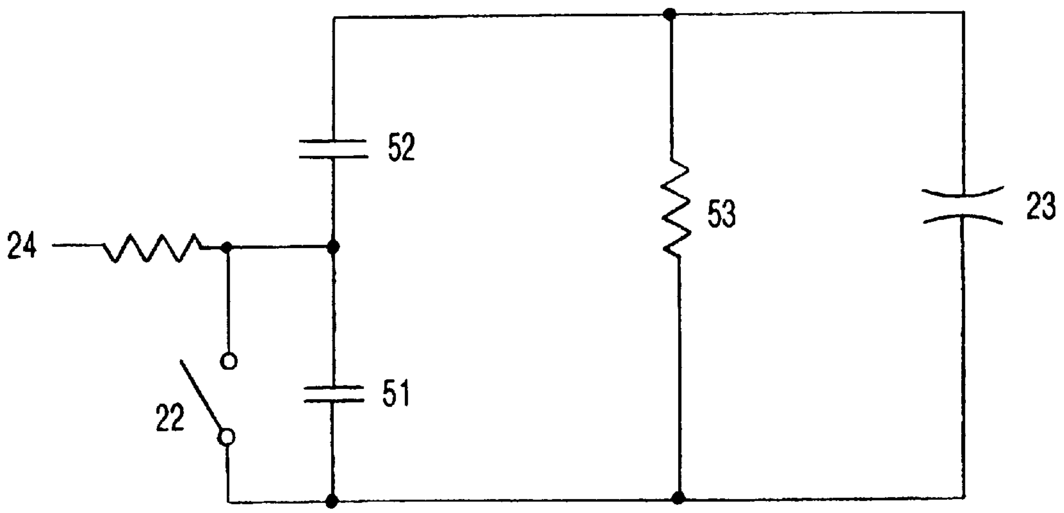
In FIG. 5B the capacitor (21) is broken into two sections, the inversion capacitor (51) and the secondary capacitor (52). In this embodiment, the pulse charging connection (24) pulse charges both capacitors. A charging inductor (53) is utilized to provide a ground connection to the secondary capacitor (52). When the switch (22) fires, it inverts the primary capacitor (51), thus adding together the voltages of 51 and 52 and impressing twice the charge voltage across the electrode gaps (23).
Figure 6A:
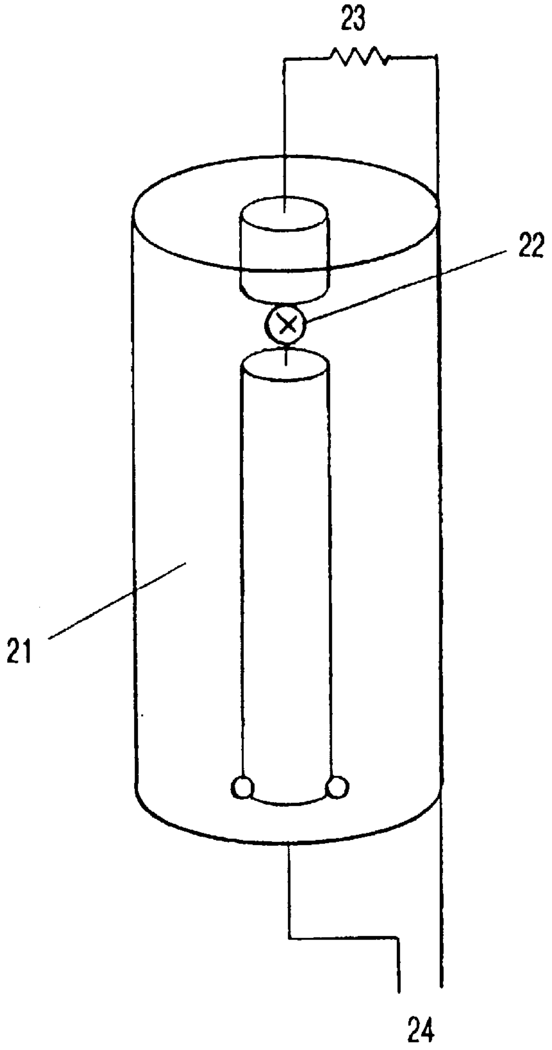
FIG. 6A shows the capacitor (21), the switch (22), the electrode array (23), and the pulse charge connection (24). In a simple coaxial transmission line in 6A, which corresponds to FIG. 5A.
Figure 6B:
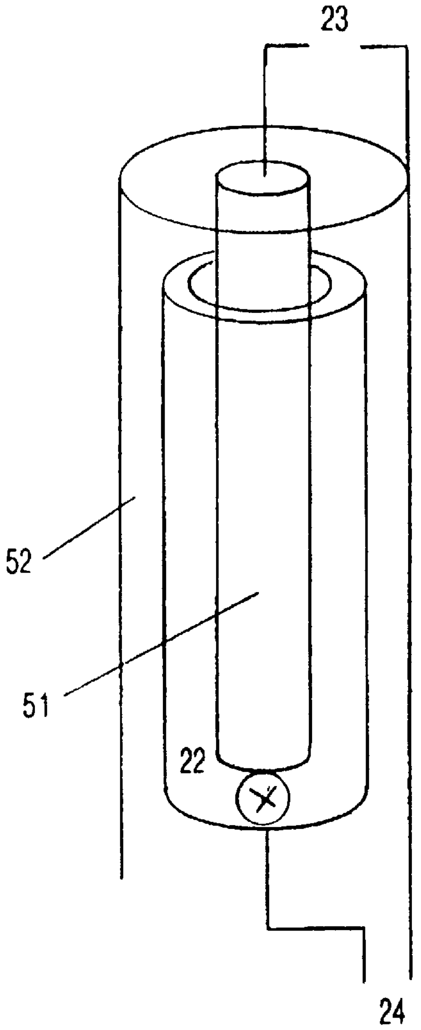
FIG. 6B corresponds to FIG. 5B and shows the transmission line primary capacitor (51), the secondary capacitor (52), the switch (22), and electrode array (23).
Figure 7A:
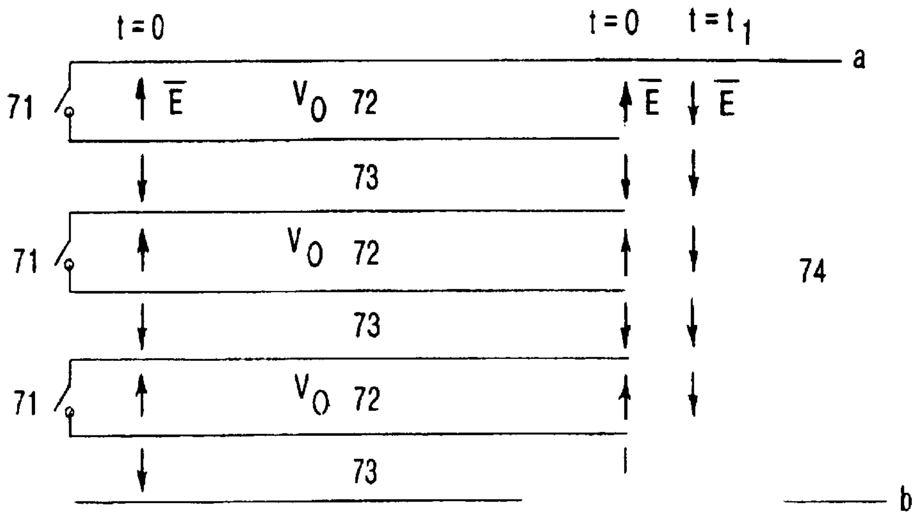
(FIG. 7A is a side view.
Figure 7B:
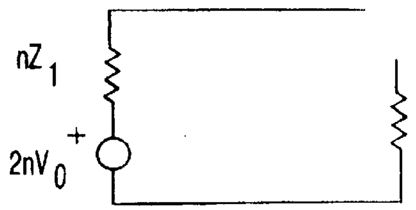
FIG. 7B is an equivalent circuit for output pulse across the load $Z_L$) shows multiple stacked coaxial pulse forming lines, which extends the voltage doubler circuit of FIG. 5 to n lines.
Figure 7C:
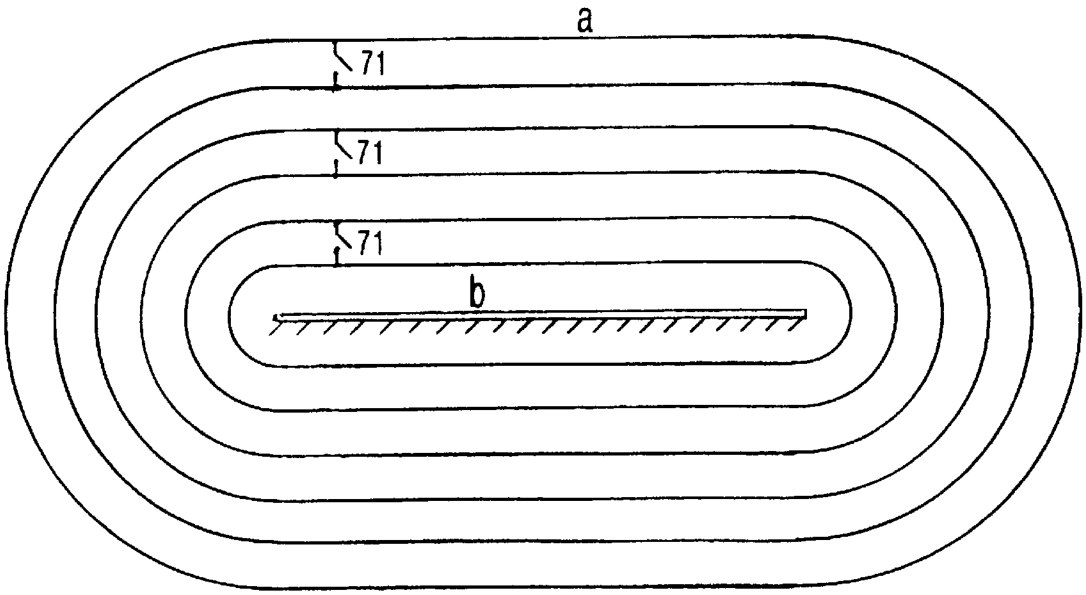
FIG. 7C is an end view.

Another embodiment is to arrange the drill stem capacitor so as to provide a doubling of the voltage by using two capacitor sections that are added by the closing of the switch. This approach also reduces the amount of the current flowing through the drill stem switch, as shown in FIG. 5. This approach combined with the tuned transition section between the switch and the electrodes described above can provide a further multiplication of the feed voltage to the bit. This approach may require a second switch to prevent bleed down of the capacitor charge through the electrodes in the presence of conductive water. Another embodiment is to employ a voltage doubler as above, but with coaxial nested capacitors (Blumlein) as shown in FIG. 6. This arrangement serves to reduce the total circuit inductance by providing self-canceling of fields. Multiple cylinders may also be arranged in a similar fashion to provide additional voltage enhancement. This requires multiple switches (see FIG. 7).

Figure 8:
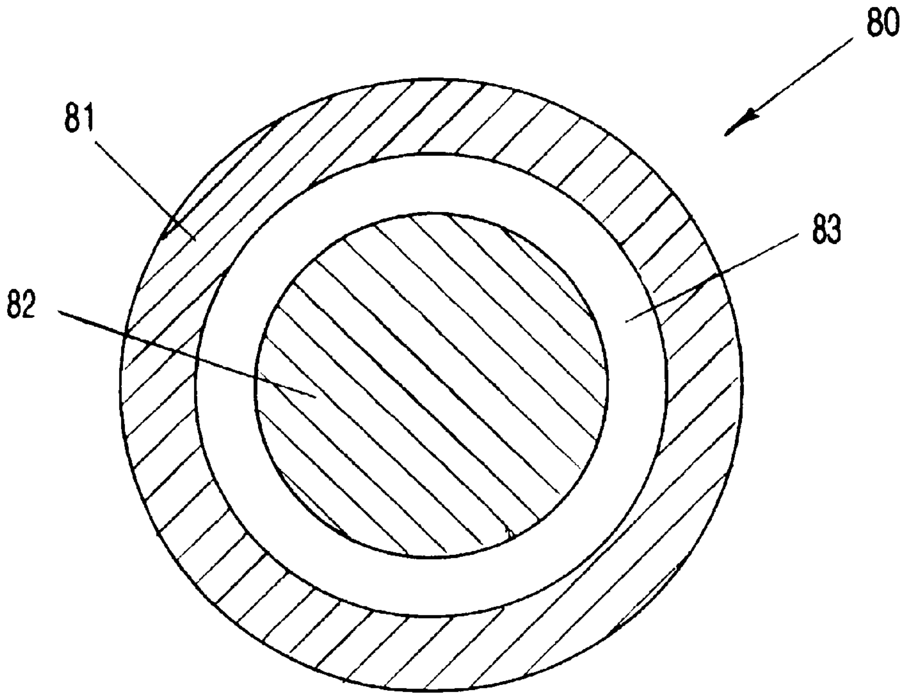
FIG. 8 shows a single gap long life electrode (80). This electrode is formed by the outer electrode (81), the inner electrode (82), and the electrode gap (83).
Figure 9A:
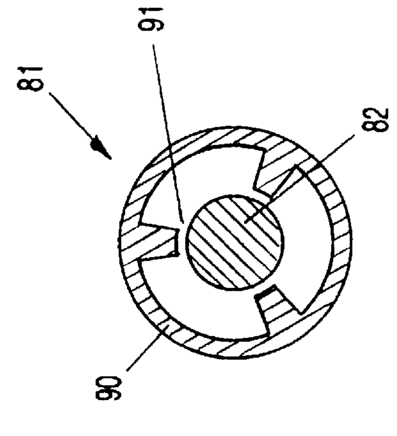
FIG. 9 shows multiple variations on the number and type of multi-gap electrode arrays (90), showing the gap (91) the outer electrode (81) and the inner electrode (82).
Figure 9B:
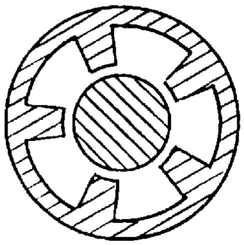
Figure 9C:
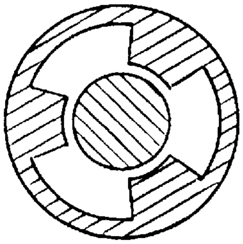
Figure 9D:
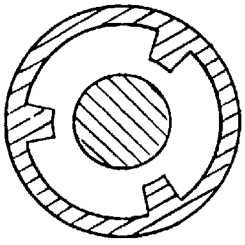
Figure 9E:
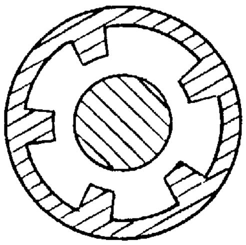
Figure 9F:
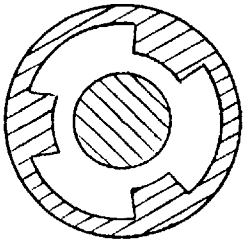

In many applications, very long electrode lifetime is desired if the transducer is used to create intense shock waves for mass processing of rock, for example. In such applications, a configuration for the electrodes as shown in FIG. 8 is preferably used. The electrodes are designed as the region between two concentric cylinders which provides very long lifetime for the electrodes because there is a large quantity of material available for electrode erosion. This approach is particularly attractive where the transducer is operated in salt water or where the liquid breakdown field is reduced and less enhancement of the electric field is required for breakdown. A wave reflector (not shown) is mounted behind the annular gap of the cylindrical electrode. If needed, water flow will typically be around the edges of the reflector to minimize pressure loss upon wave reflection.

FIG. 9 shows a variation on the single gap electrode, where multiple electrode gaps are run in parallel. If the rate of rise of voltage across the gaps is sufficiently rapid, multiple gaps will ignite and operate simultaneously. FIG. 9 shows multiple embodiment of the number and type of multi-gap electrode arrays (90), showing the gap (91), the outer electrode (81), the inner electrode (82). This technique provides very high current through the gaps (91), but is not beneficial for improving the energy delivery between the source and the load because of the net reduction on load impedance.

Figure 10:
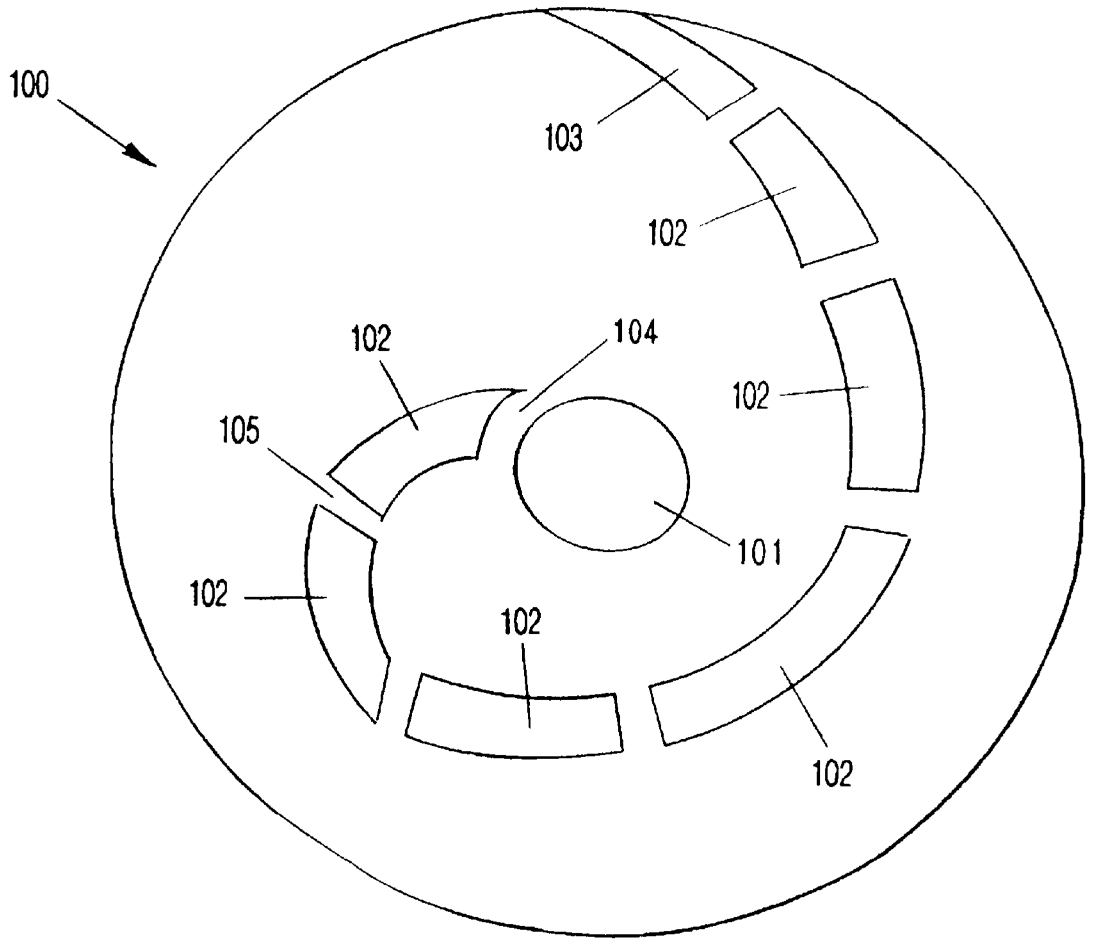
FIG. 10 shows the multiple series gap in a seven gap spiral line embodiment (100). The center electrode (101) is shown along with the secondary electrodes (102) and the current return, or ground electrode (103). The gap between each electrode is shown (104).
Figure 11:
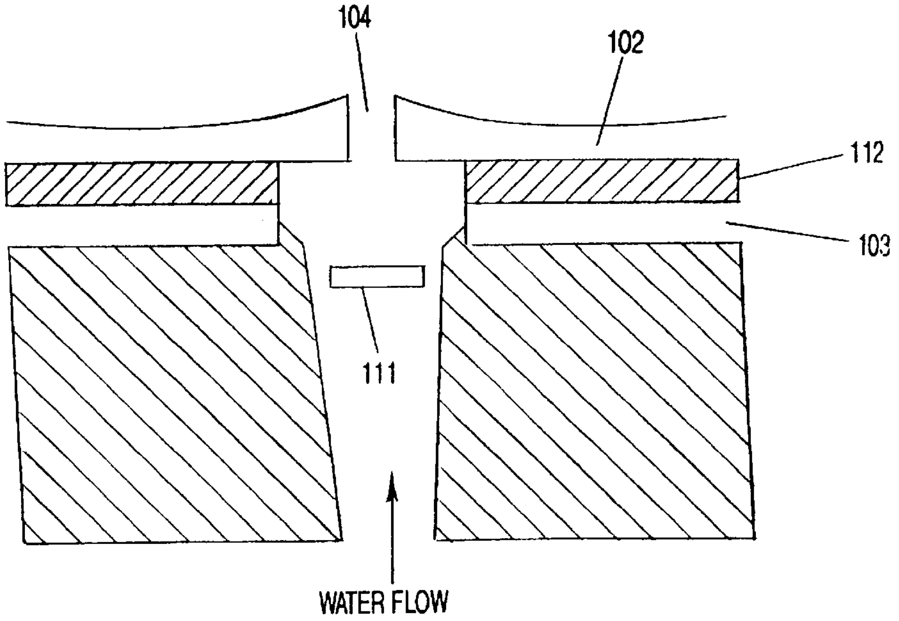
FIG. 11 shows the side view of the transducer electrode, with the electrode gap (104) illustrated with a reflector (111) underneath the gap to reflect the pressure wave back through the gap. The conductor might be an intermediate electrode (102) or a center or edge electrode. The dielectric (112) separates the electrode from the current return, which is electrically the same as the current return electrode (103).

FIG. 10 shows the invention of methods of operating an array of underwater plasmas in series so each electrode gap impedance adds to the next electrode gap impedance, and the net load impedance is the sum of the impedance of the individual gaps. If sufficient capacitance is provided from each electrode to ground, then each individual electrode gap will break down at a voltage approximating the breakdown voltage for a single gap, rather than breakdown voltage for the sum of the gaps. In the configuration shown in FIG. 10, the center electrode (101) is the high voltage electrode, and seven electrode gaps (105) form a spiral strip line of gaps extending to the current return electrode at the outer edge (103) to yield a broad pressure wave output. This embodiment shows seven gaps, but any number of gaps ranging from two to a large number are feasible. Current return for the gaps is not at the outer edge of the cylinder, but is underneath the strip line as shown in FIG. 11. The current return path fills a number of functions in this design. First, it reduces the inductance of the array of gaps, and second, it provides capacitance between each top segment (102) of the strip line and the ground (103) underneath for gap ignition.

The operation of the series array is illustrated by referring to FIGS. 10 and 11. When the voltage rises on electrode (101), electrode (102) acts as if it is coupled to the ground. The capacitance formed between (102) and the current return (103) is charged. This capacitance coupling to the ground provides just enough voltage differential across the gap to break the gap down. Thus, when the voltage rises on the high voltage side, for a short period of time the secondary electrode is capacitively connected to ground, and the gap breaks down at a voltage similar to what it would be if it were a single gap. The amount of capacitance that is required is determined by the width of the gap, and the rise time of the electric field imposed in the liquid across the gap. The amount of capacitance provided is determined by the thickness and dielectric constant of the insulator (112), and the width and length of the transmission line segment formed by electrode (102) with the current return (103). The initial high-voltage pulse breaks down the gap at gap (104), the resulting voltage wave propagates along the electrode to the second gap at (105). Because of the capacitance, gap (105) will breakdown at a voltage approximately that of a single gap. In this fashion, a breakdown wave propagates along the array of gaps, breaking each one down in turn. But the total breakdown voltage is 1.5–2 time that of the breakdown voltage of the individual gaps, depending on the number of gaps. In this fashion, all of the gaps in the series can be broken down at moderate voltage. When the gaps are all broken down and current is flowing through the gaps, the total impedance is the sum of the impedances of the individual gaps. This invention is able to better match the load impedance of the array of gaps to the source impedance.

Figure 12:
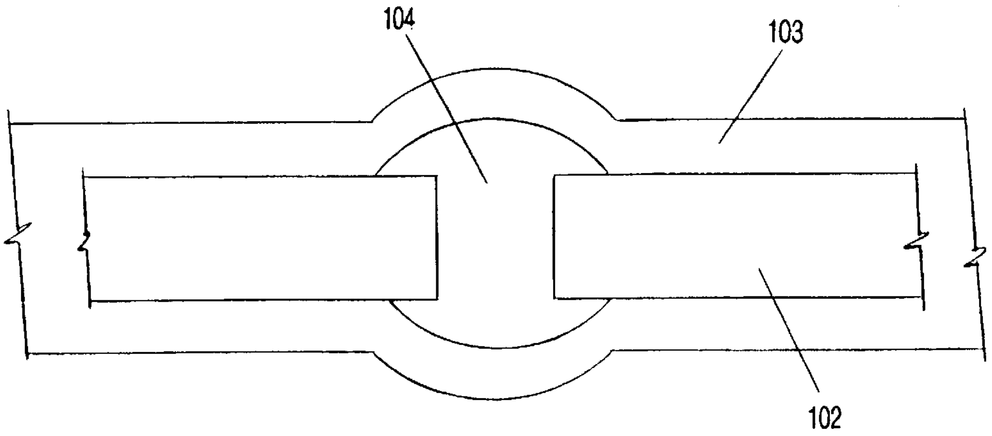
FIG. 12 is a top view of one embodiment of the projector electrode, showing the current return (103) underneath the primary electrode (102). It also shows the gap (104). There are multiple variations of this possible. The dielectric (112) is not shown in FIG. 12.

FIG. 12 shows a top view of FIG. 11, with the insulator removed to show how the return strip goes around the gap. This figure shows the electrode gap (104), the shock wave reflector (111), and the current return strip (103). Note in FIG. 12 that the current return strip goes around the gap so that it does not interfere or provide a path for voltage flashover in the gap region. The current return strip is buried underneath the insulator so there is no risk of breakdown.

Figure 13:
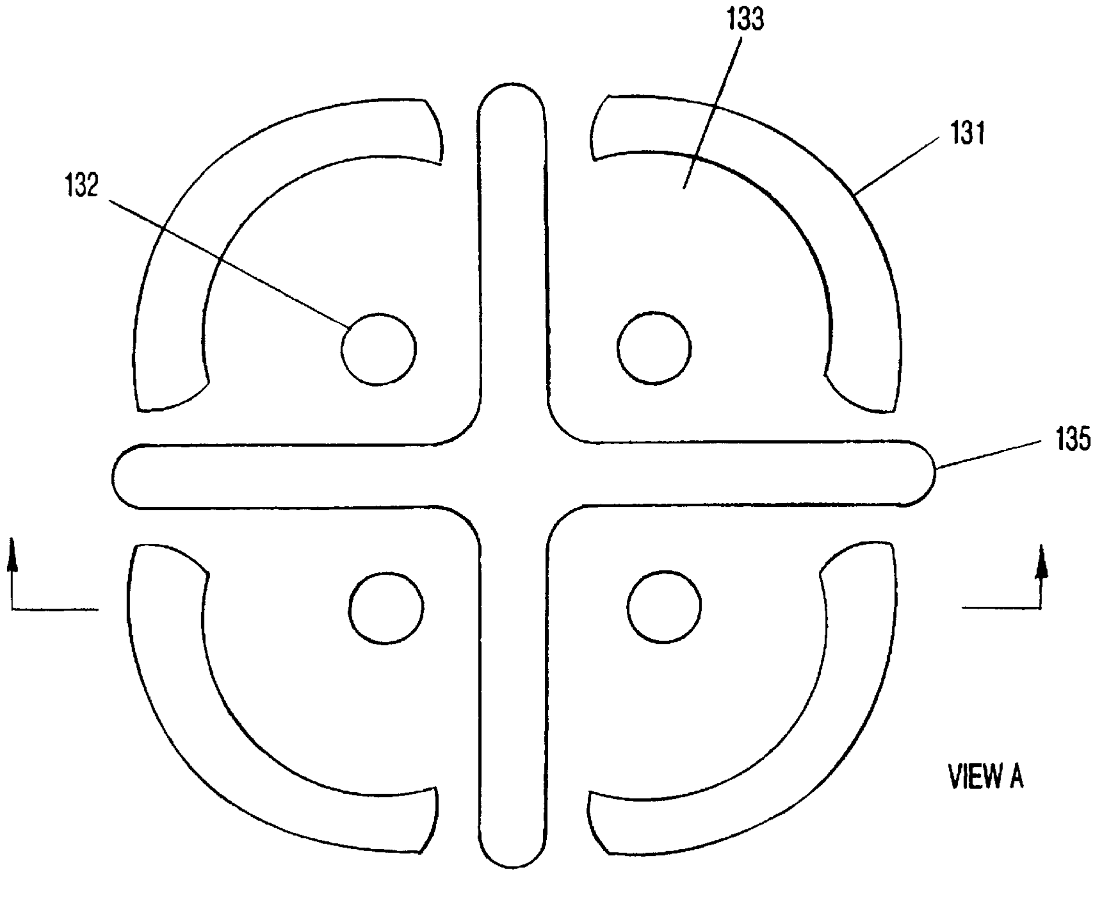
FIGS. 13 and 14 show a symmetric projector using series electrode connections. The outer electrodes (131) and the inner electrodes (132) form a gap (133) between them. By connecting the inner electrodes in series by pairs and one set of the outer electrodes in series and feeding current return from one outer electrode and high voltage feed to the other outer electrode, a series arrangement is produced that provides a symmetric pressure wave formation, at the same times providing the impedance enhancement from the series arrangement. The capacitance necessary for series ignition of the projector of FIG. 13 is formed by the long structure shown in FIG. 14. The cross section view (AA) in FIG. 13 is shown in FIG. 14. The outer electrodes (131), the inner electrodes (132), the gap (133), the insulator (134), and the series connection between two inner electrodes (135) is shown. Note that the insulator (134) extends above the electrodes to prevent surface flash over.
Figure 14:
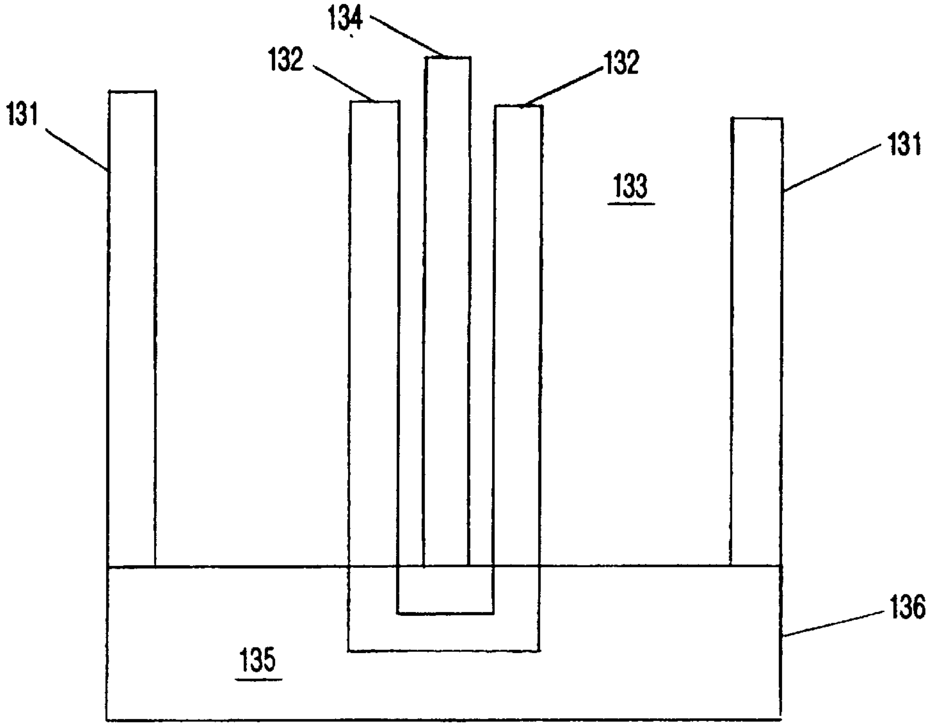
Figure 15:
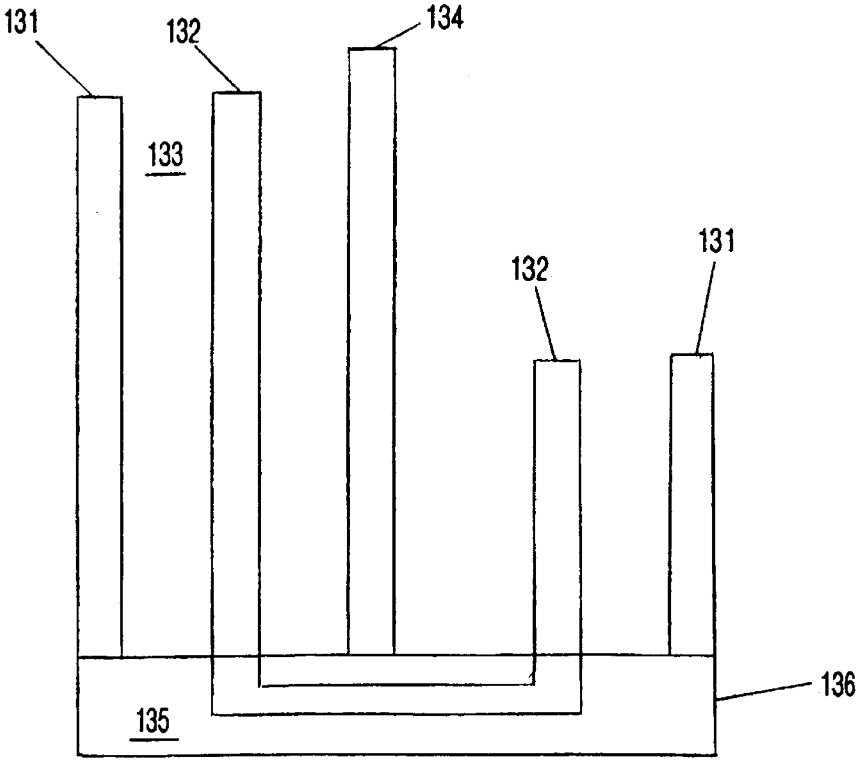
FIG. 15 shows the staggered faced version of the star electrode shown in FIGS. 13 and 14. In this embodiment, the electrodes are arranged at different heights so as to provide a tilt to the pressure wave being emitted.

There is an alternate approach to this series arrangement of electrodes, as shown in FIG. 13 and referred to as the star configuration. This figure shows four pairs of electrodes. One electrode (131) is shown as the outer electrode located near the cross-shaped insulator (132), each outer electrode has a corresponding inner electrode, which forms the electrode pair. The electrodes are connected in series inside the electrode feed and support structure. Adequate space is provided around each set of electrodes to allow water flow to sweep out the debris of bubbles and gas resulting from each discharge, as shown in FIG. 14. It is possible to arrange the star electrodes (131 and 132) in FIG. 13 so the pressure wave is emitted at an angle by locating one set of electrodes at a shorter distance from the feed structure (136) as shown in FIG. 15.

Figure 16:
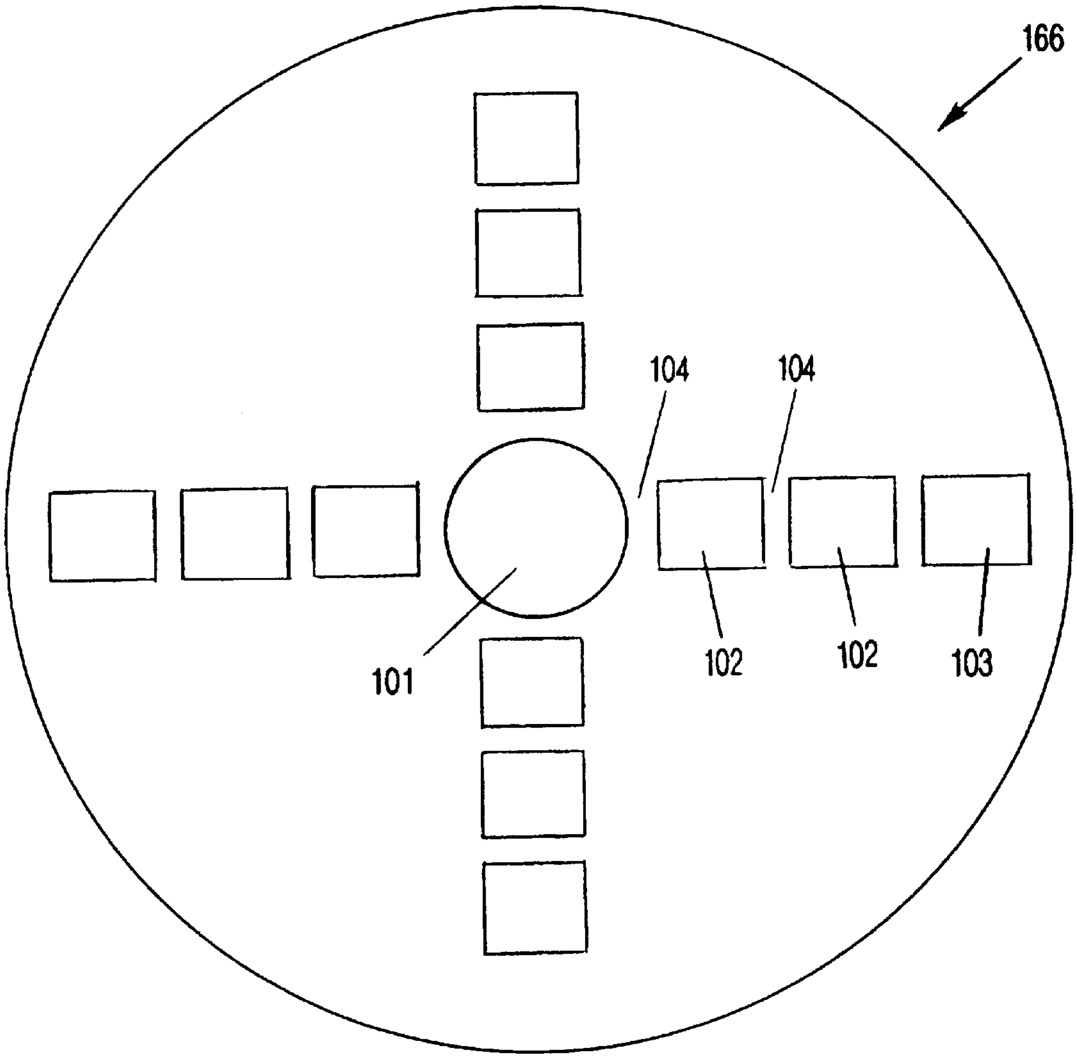
FIG. 16 shows a series parallel array (166), where the central electrode feed (101) is connected in series across multiple gaps (104) and secondary electrodes (102) to the current return electrode (103). The current return path (not shown) provides current return underneath the series lines to minimize inductance and provide adequate capacitance for gap ignition.

Several strip line series gaps can be connected in parallel to form an array of electrode gaps. In the embodiment shown in FIG. 16, each of four strip lines (161) are connected in parallel around a central electrode feed (101). Each of the strip lines (161) has a current return path (103) built underneath the strip line as in FIGS. 11 and 12 to provide a low inductance capacitive connection for gap ignition (104). This embodiment is useful where the plasma impedance of a single gap is adequate to achieve reasonable energy transfer, but where the gain in focusing and pressure wave delivery to the target from using sixteen gaps instead of one is significant. This array would provide sixteen individual pressure waves, if each gap is separated from the other by a few wave lengths, at a load impedance equivalent to a single gap. It can readily be appreciated that such a series parallel array can be designed to produce a load impedance higher than that of a single gap, or lower than that of a single gap, by varying the ratio of the number of gaps in a given strip line to the number of parallel strip lines. Other embodiments of the series array are feasible, including a single straight array of gaps across the face, and other similar geometric shapes. The principle of the invention is not limited to a specific arrangement of the electrodes across the face, but rather is the capability of individually igniting each gap through the capacitive coupling so that a series of such gaps can be configured to provide increased overall impedance, while at the same time providing a breakdown voltage that is similar to that of a single gap.

Figure 17:
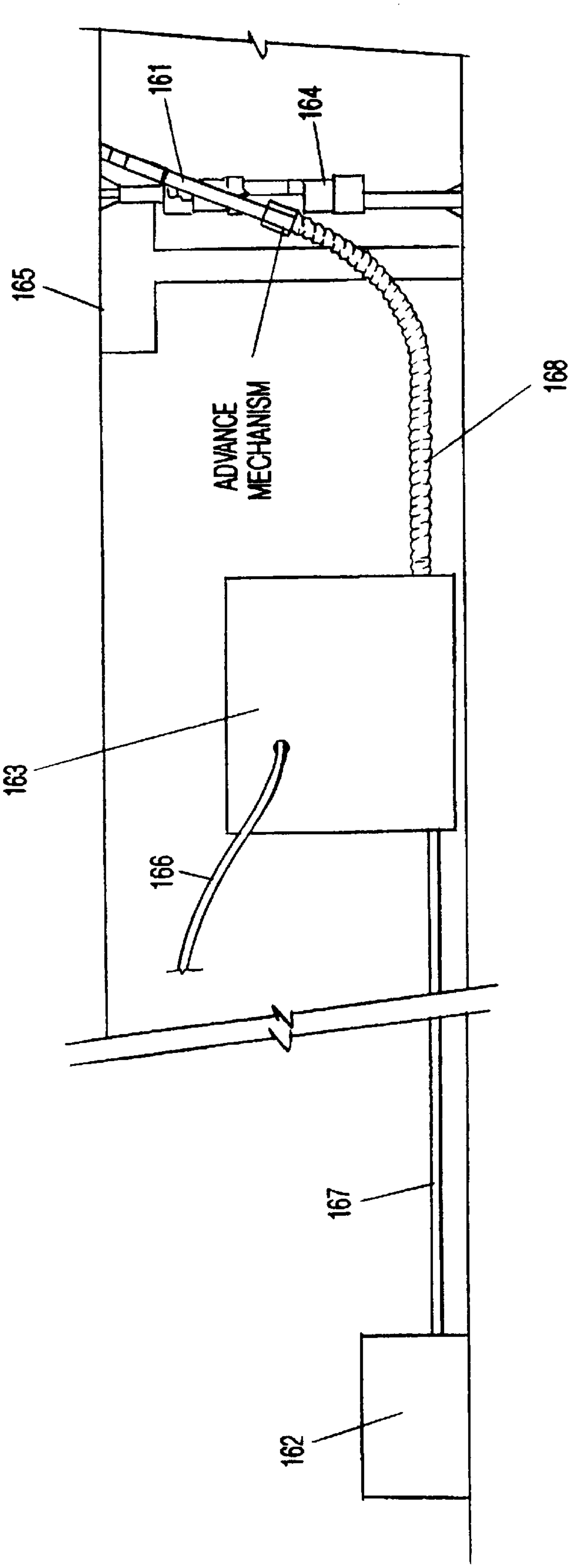
FIG. 17 shows one embodiment of the underwater plasma projector to drilling in a mining application. The projector (not shown) is located in the drill stem (161). The jack leg (164) supports and guides the drill into the mine roof (165). Water for flushing the drill goes into the pulse generator through connection (166). Power is transmitted from the power supply (162) to the pulse generator (163) over the power cable (167).
Figure 18:
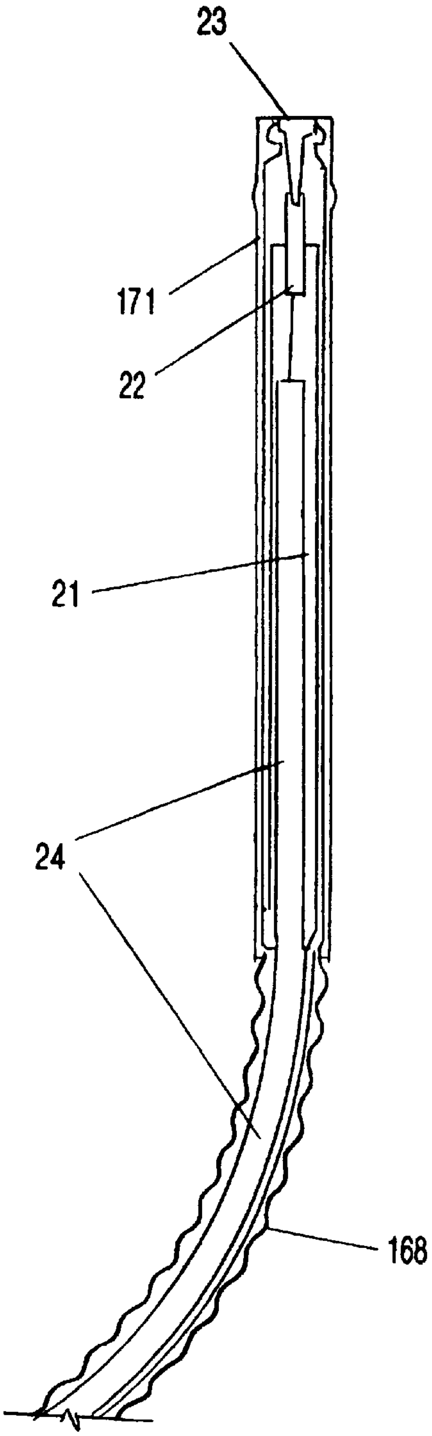
FIG. 18 shows the embodiment of the electrohydraulic projector located in the roof bolt drill stem.

Drilling with a focused pressure wave utilizes a high energy pressure wave projector to create this pressure wave. This wave is then focused on the rock, where it crushes the rock. FIGS. 17 and 18 show the basic layout of an embodiment of the electrohydraulic pressure wave generator in a pulse generator plasma drill for drilling holes in rock for explosives or for the installation of roof bolts. The electrohydraulic pressure wave generator (25) is located in the drill stem (161). The invention utilizes a pulse generator (24) to pulse charge the electrohydraulic projector. The pulse generator utilizes a power supply (162) to charge the projector (25) to the desired voltage. In the drill stem (162) is housed the energy storage device (21), the switch (22), and the electrode army (23). The drill stem capacitor is pulse charged from the pulse generator.

There are several variations on the layout of the primary energy storage pulse generator. A convenient approach is to use a switching power supply (162) to provide power to the pulse generator (163). On command from the control system, the switching power supply (162) charges the pulse generator and then ceases charging and disconnects from the pulse generator. Shortly after the charging cycle is complete, the control system (not shown) then causes the pulse generator to send a pulse of energy to the energy storage capacitor (21) in the projector. A second approach is to utilize the inductance in the cable (168) connecting the pulse generator (163) to the capacitor (21) to resonantly charge the capacitor (21). The jack leg (164) supports and guides the drill into the mine roof (165). Water for flushing the drill flows into the pulse generator through connection (166). Power is transmitted from the power supply (162) to the pulse generator (24) over the power cable (167).

Figure 19:
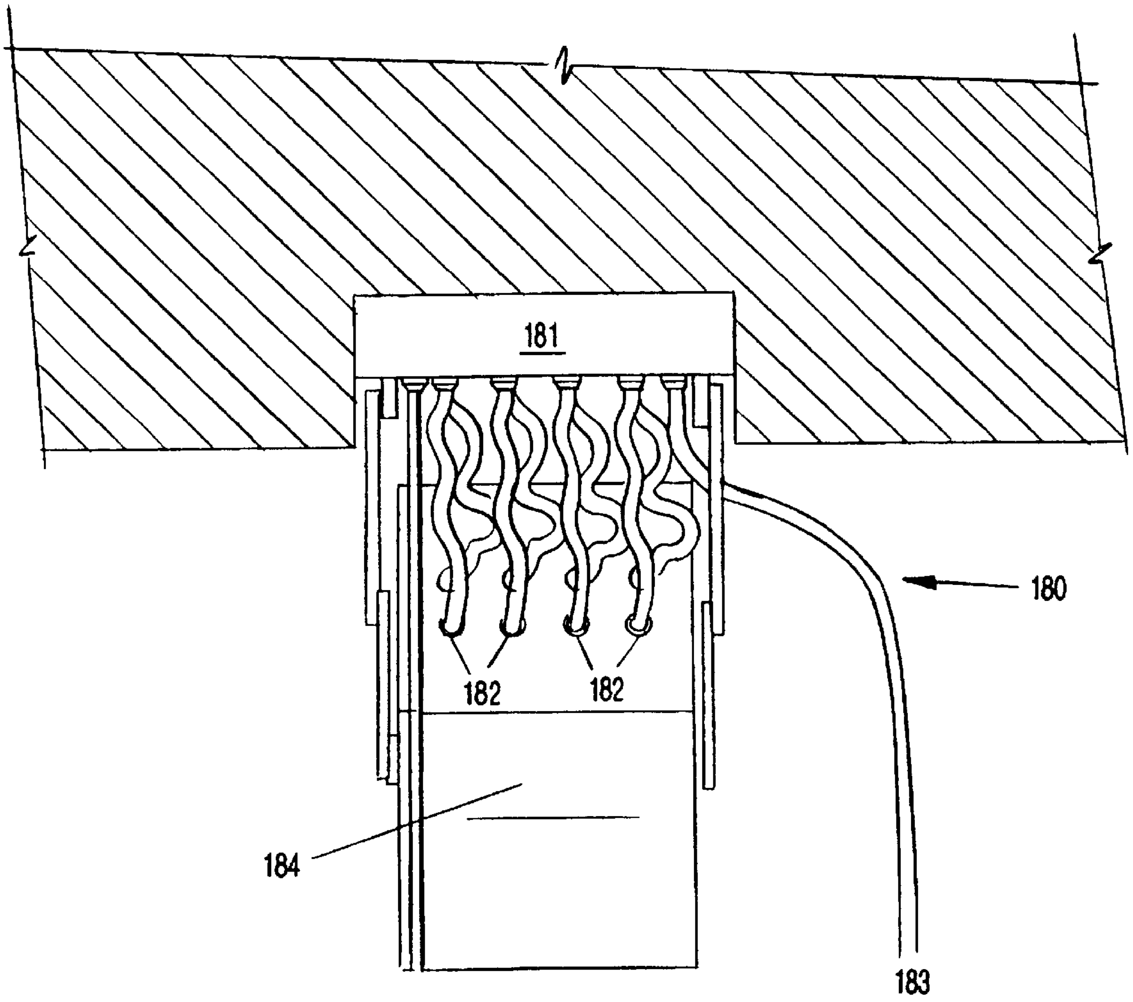
FIG. 19 shows a mining machine (180), comprising an array of electrohydraulic projectors (25) (not shown) in a housing (181) with the wiring (182) and water feed (183) connecting the projectors (25) to the pulse power driver (184).

It is possible to arrange a series of the projectors (17) of the invention in a two-dimensional array to provide the capability of mining the rock in a rectangular slot for either mine construction, or for mining a vein of ore as shown in FIG. 19. FIG. 19 shows a mining machine (180) comprising an array of such projectors (25) (not shown) in a housing (181) with the wiring (182) connecting the projectors (25) to the pulse power driver (184) and water feed (183). FIG. 20 shows such a machine (180) mounted on rails (192) mining a vein of ore (191) in an underground mine. The array of projectors (25) would typically be operated simultaneously, but for steering purposes might have their ignition phased in time. Such an array can be expanded to two dimensions to provide a larger array of projectors (25), for boring tunnels and mining large blocks of ore.

Figure 21:
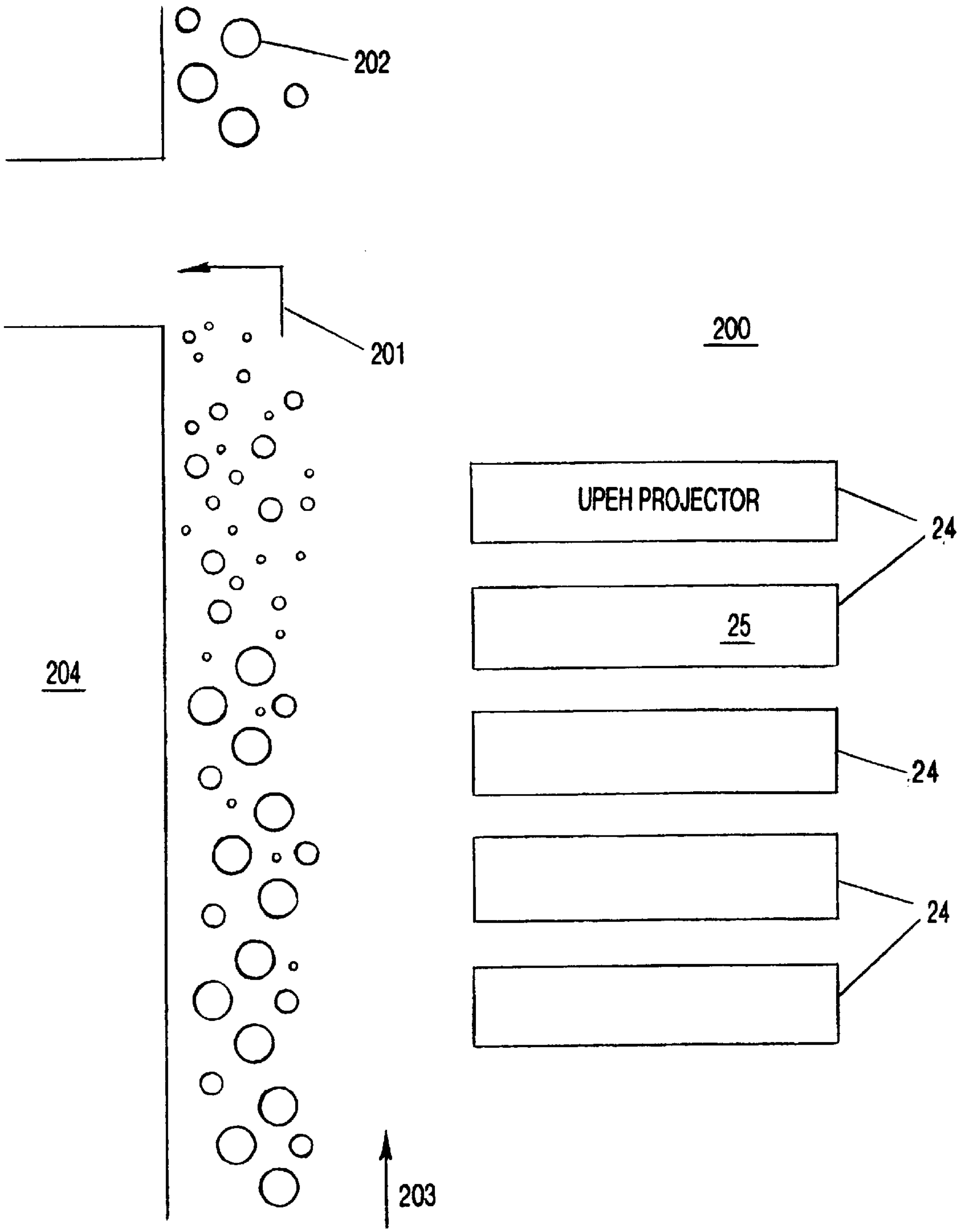
FIG. 21 shows an electrohydraulic ore crushing machine (200), comprising an array of electrohydraulic projectors (25) operated in a machine channel (201) with the ore (202) fed into the ore channel and water flow (203) flowing through the passage formed by the wall of the ore crushing machine (204) to sweep out the crushed ore. The projectors are fed from a pulse generator connection (24).

The projectors (25) can be arrayed along the wall of an ore crushing machine (200) to crush ore (202), as shown in FIG. 21. Ore (202) to be crushed is brought along the wall (204), and by repeated firing of the projectors (25), shock waves are generated which crush the ore. The ore (202) is moved past the projectors by water flow (203). The projectors continuously crush the ore while firing repetitively. As shown in FIG. 21, water flow can be utilized to control the particle size in the crushing process by flowing upward vertically in the ore crusher (200), bringing the ore (202) past the array of projectors (25). The water flow is adjusted so that very small particles of the size desired flow out through the top, while larger particles that still need to be crushed sink down through the water. In this fashion, the system acts to separate the ore, keeping the particles in the water stream for the desired length of time until they've been crushed to the correct fineness. The raw ore is added at the top.

Figure 22:
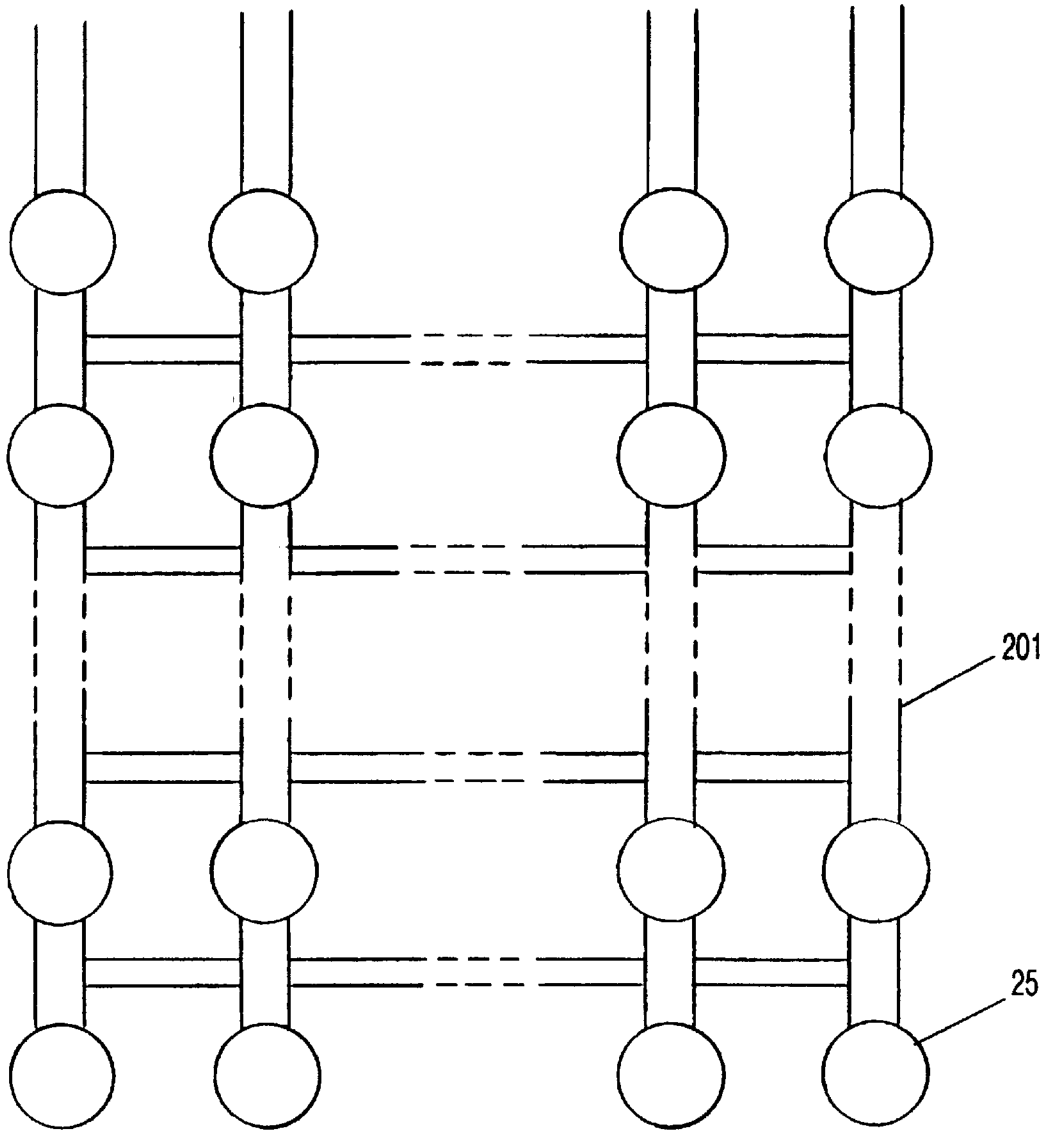
FIG. 22 shows an array of projectors (25) supported by a grid structure (201). Such an array is utilized to create a pressure wave, that can be focused by adjusting the timing of the firing of the projectors.

FIG. 22 shows an array of projectors (25) supported by a grid structure (201). Such an array is utilized to create a broad pressure wave, that can be focused by adjusting the timing of the firing of the projectors.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A projector for creating electrohydraulic acoustic or pressure waves in a fluid comprising:

at least one set of at least two electrodes defining therebetween at least one electrode gap having a gap space, wherein all said gaps share a common electrode;

a pulsed electrical energy source for providing electrical energy to said electrodes to create a plasma between said gaps, said plasma creating the electrohydraulic acoustic waves by thermal expansion of the fluid; and means for connecting said pulsed energy source to said electrode array.

2. The projector of claim 1 comprising a plurality of said gaps wherein said plurality of gaps are disposed in electrical parallel and all said gaps share a common electrode.

3. The projector of claim 2 wherein all said gaps share a common first electrode and wherein all said gaps are defined by a common second electrode, wherein further said gaps are inductively isolated from each other by a plurality of extensions of said second electrode.

4. The projector of claim 3 wherein said second electrode, comprising said plurality of extensions, surrounds said first electrode.

5. The projector of claim 1 comprising a plurality of said gaps coaxially disposed whereby plasma arcs between electrodes occur radially.

6. The projector of claim 1 comprising a plurality of said sets of electrodes defining a plurality of electrode gaps, wherein said plurality of sets of electrodes are driven by a single pulsed electrical energy source.

7. The projector of claim 1 further comprising at least one pressure wave reflector corresponding to each of said gaps, each of said reflectors disposed within 10 times said gap space from each of said gaps.

8. The projector of claim 1 further comprising:

at least one pressure wave reflector disposed proximate to at least one of said gaps;

a conductor, disposed proximate to each of said electrodes and insulated from said electrodes, comprising a current return structure in the electrode gap to provide capacitance with the electrode.

9. The projector of claim 6 wherein said plurality of sets of electrodes are arrayed symmetrically and wherein insulators separate said sets from each other.

10. The projector of claim 6 wherein said plurality of sets of electrodes are arrayed asymmetrically and wherein insulators separate said sets from each other.

11. The projector of claim 8 wherein said plurality of electrode sets are staggered axially in relation to said projector.

12. The projector of claim 6 wherein said plurality of sets of electrodes are disposed in electrical series.

13. The projector of claim 1 wherein said pulsed electrical energy source comprises a source having less than 1 ohm source impedance.

14. The projector of claim 1 wherein said pulsed electrical energy source and said connection means are configured to provide less than approximately 1 ohm source impedance to said electrodes.

15. The projector of claim 1 said connection means comprises a switch selected from the group consisting of pseudospark switches, spark gaps, thyratrons, and mechanical switches.

16. The projector of claim 1 wherein said connection means comprises a means for switching comprising said electrode gaps.

17. The projector of claim 1 wherein said pulsed energy source comprises a member selected from the group consisting of capacitors and inductive storage devices.

18. The projector of claim 17 wherein said capacitor comprises windings of alternate layers of conducting material and dielectric material, and wherein said windings provide a low inductance configuration to the capacitor.

19. The projector of claim 1 wherein said pulsed energy source comprises a capacitor comprising nested concentric conducting cylinders.

20. The projector of claim 1 wherein said pulsed energy source comprises a capacitor comprising non-concentric cylindrical conductors.

21. The projector of claim 19 wherein said cylindrical conductors are disposed in a liquid dielectric.

22. The projector of claim 19 further comprising insulators disposed between said cylindrical conductors, said insulators comprising a member selected from the group consisting of polymer and paper dielectric films, and oil and paper dielectric films.

23. The projector of claim 19 wherein each said cylinder comprises a metal film disposed upon a cylinder, said cylinder comprised of a member selected from the group consisting of polymers, ceramics, and paper dielectric.

24. The projector of claim 19 wherein said concentric cylinders are connected electrically in parallel thereby to reduce source impedance.

25. The projector of claim 1 wherein said electrical energy source further comprises a pulse generator selected firm the group consisting of vector inversion generators, capacitor and switch pulse generators, voltage doubler pulse generators and inductive storage pulse generators.

26. The projector of claim 1 wherein said means for connecting comprises a pulse forming line transformer.

27. The projector of claim 1, further comprising a drill apparatus having a drill stem, wherein said projector is disposed within said drill stem.

28. The projector of claim 1 comprising a plurality of said projectors arranged in an array.

29. The invention of claim 28 wherein each projector in said array is controllably fired to provide focusing and steering of the resulting pressure wave.

30. The invention of claim 28 wherein each of said projectors comprises a discrete energy source, and further wherein said energy sources are fired in groups of at least two, and further comprising a means for switching corresponding to one of each of said groups, said switching means controlling said corresponding group.

31. The invention of claim 28 further comprising a common outer case for said array of projectors wherein current return is via said common outer case.

32. The invention of claim 28 further comprising a drill apparatus having a drill stem, wherein said array is disposed within said drill stem.

33. The projector of claim 1 further comprising a substance fracturing machine having a housing, wherein said projector is contained within said housing and configured so that the pressure waves created by said projector impinge on the substance thereby fracturing the substance.

34. The invention of claim 28 further comprising a substance crushing machine having a housing wherein said array of projectors is contained within said housing and configured so that the pressure waves created by said array impinge on the substance thereby fracturing the substance.

35. The projector of claim 1 further comprising a material crushing machine having means for directing a fluid flow, wherein the fluid flow transports crushed material away from said projector, and transports uncrushed material to said projector.

36. The invention of claim 28 further comprising a crushing machine having means for directing a fluid flow, wherein the fluid flow transports crushed material away from said array, and transports uncrushed material to the array.

37. An apparatus for creating electrohydraulic acoustic or pressure waves in a fluid comprising:

a set of at least two electrodes, each two electrodes defining therebetween an electrode gap having a gap spacing;

a reflector disposed within approximately 10 times said gap spacing from said gap to reflect the electrohydraulic acoustic or pressure waves; and a conductor disposed within 10 times said gap spacing from said gap, and comprising a current return conductor in said electrode gap.

38. The apparatus of claim 37 further comprising a conductor disposed within 10 times said gap spacing from said gap and insulated from said electrodes, said conductor comprising a current return conductor in the electrode gap to provide capacitance with the electrode.

39. A method for creating electrohydraulic acoustic or pressure waves in a fluid, utilizing plasma within the fluid, the method comprising the steps of:

a) providing a set of at least three electrodes defining at least two electrode gaps, wherein at least two gaps share a common electrode;

b) providing fluid at the electrodes;

c) providing electrical energy to the electrodes with a pulsed electrical energy source to create a plasma between the gaps, the plasma creating the electrohydraulic acoustic or pressure waves by thermal expansion of the fluid; and d) connecting the pulsed energy source to the electrodes.

40. The method of claim 39 wherein the step of providing electrical energy comprises providing a low impedance source connected to an electrode array so as to provide less than approximately one ohm impedance power feed to the electrodes.

41. The method of claim 39 further comprising the step of reflecting shock and pressure waves.

42. The method of claim 41 further comprising the step increasing the efficiency of the electrodes by providing at least one reflector disposed proximate to each of the gaps to reflect the pressure and shock waves.

43. The method of claim 39 further comprising the steps of:

(a) providing low-impedance power feed to the electrodes from the energy source by utilizing a capacitor comprising nested concentric cylindrical conductors;

(b) embedding the cylindrical conductors in a dielectric, said step of imbedding comprising a step selected from the soup consisting of embedding in a liquid dielectric, embedding cylindrical conductors insulated with polymer paper dielectric films, embedding cylindrical conductors insulated with oil paper films, or embedding cylindrical conductors made from metal films deposited on polymer or paper dielectric cylinders, or embedding cylindrical conductors made from metal film deposited on ceramic cylinders; and (c) connecting said cylindrical conductors in parallel to reduce the source impedance.

44. The method of claim 43 wherein the step of providing a low impedance power feed to the electrodes comprises providing a capacitor pulse charged via a pulse generator and cable, whereby said pulse generator utilizes a switch selected from the group consisting of triggered self-break switches.

45. The method of claim 39 further comprising the step of arranging a plurality of electrodes in an array.

46. The method of claim 45 further comprising the step of operating the array of electrodes in series with at least one electrode common to a plurality of electrode gaps, wherein an impedance of each electrode gap adds to a next electrode gap impedance, whereby net load impedance is a sum of individual gaps, said series array utilizing capacitance from each electrode to a ground or current return conductor proximate to each electrode, thereby enabling each gap to break down sequentially.

47. The method of claim 39 wherein the step of providing electrical energy comprises selecting a pulse generator from the group consisting of pulse generators, vector inversion generators, capacitor and switch pulse generators, voltage doubler pulse generators, and inductive storage pulse generators.

48. The method of claim 39 further comprising increasing the area of the projector face and the number of plasma sites by operating a plurality of strip lines of series electrode gap sets arrayed so that current flows through said plurality of strip lines in parallel.

49. The method of claim 39 further comprising the step of increasing the number of plasma sites by operating an array of electrode sets in parallel whereby the electric current flows through the array of gaps in parallel.

50. The method of claim 46 comprising the step of controlling the pressure waves by utilizing a discrete energy source for each array and firing said energy sources in groups of two or more with a single switch controlling each group.

51. The method of claim 50 comprising firing said groups at different times.

52. The method of claim 45 further comprising the step of reducing source impedance of a projector by providing an outer case for current return for the array.

* * * * *